UNITED STATES PATENT OFFICE.

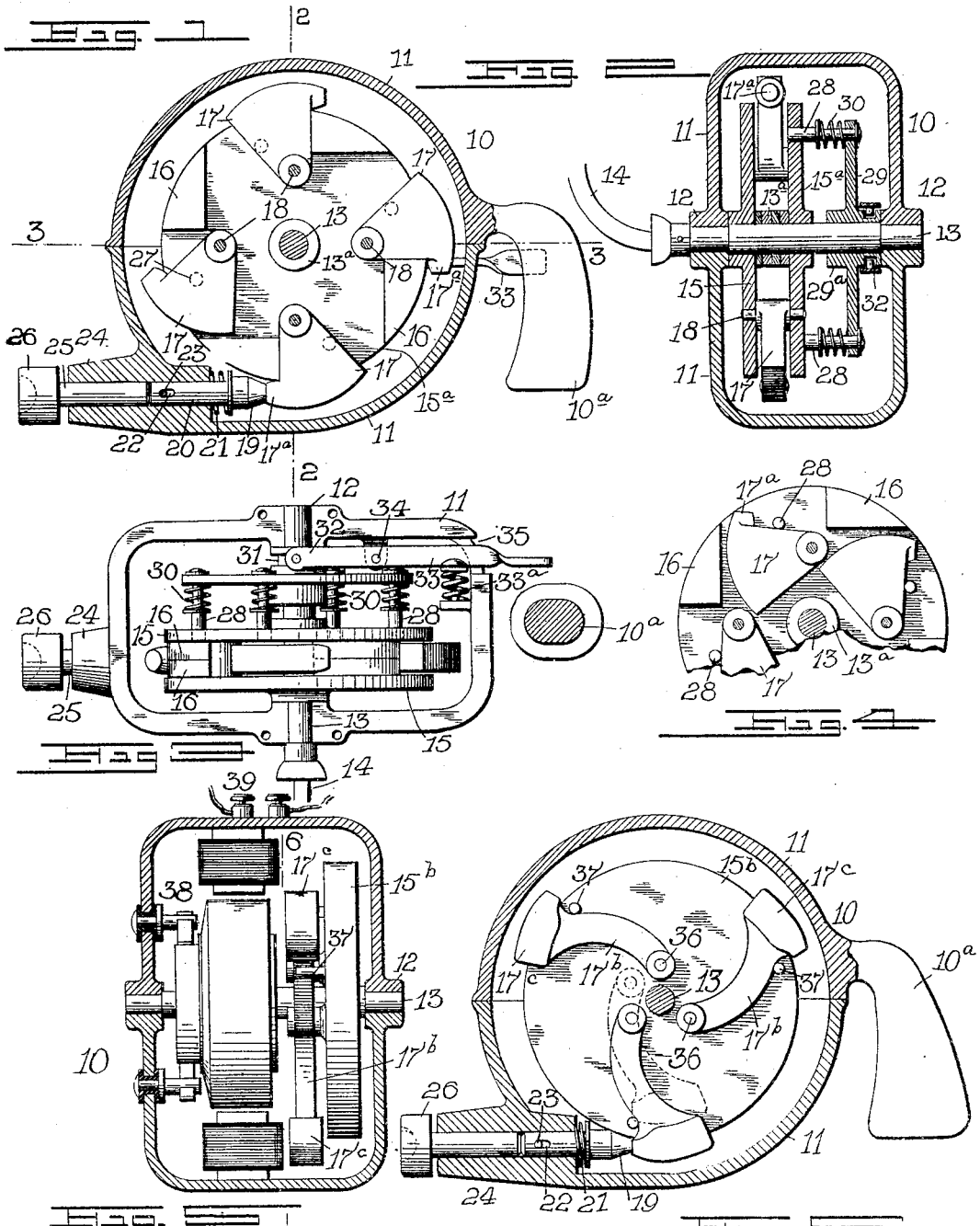

MILTON T. WESTON, OF NYACK, NEW YORK, ASSIGNOR OF ONE-HALF TO WILLIAM F. HUTCHINSON, OF NYACK, NEW YORK.

POWER-HAMMER.

No. 809,348.      Specification of Letters Patent.      Patented Jan. 9, 1906.

Application filed June 3, 1904. Serial No. 210,950.

*To all whom it may concern:*

Be it known that I, MILTON T. WESTON, of Nyack, in the county of Rockland and State of New York, have invented a new and Improved Power-Hammer, of which the following is a full, clear, and exact description.

My invention relates to improvements in power-hammers; and the object of my invention is in the main to produce an efficient and compact power-hammer which can be adapted to a great many purposes and which can be conveniently manipulated.

A further object of my invention is to produce a comparatively simple device in which a series of rotating hammers are arranged to successively strike a plunger which can be made to impinge on any suitable tool and to have the hammers and the whole mechanism carried in a convenient casing which is provided with a handle and constructed so that the affair can be easily operated and so that this can be done with safety to the operator and without danger of disorganizing the mechanism.

Another object of my invention is to construct the device so that the hammers can be instantly thrown into or out of operation.

With these ends in view my invention consists of a power-hammer the construction, arrangement, and operation of which will be hereinafter fully described and the novel features claimed.

Reference is to be had to the accompanying drawings, forming a part of this specification, in which similar figures represent corresponding parts in all the views.

Figure 1 is a central section taken transversely of the shaft of the device. Fig. 2 is a cross-section on the line 2 2 of Fig. 1. Fig. 3 is a cross-section on the line 3 3 of Fig. 1. Fig. 4 is a broken detail sectional view showing the hammers out of use. Fig. 5 is a section similar to that shown in Fig. 2, but illustrating how an electric motor can be conveniently used for operating the device and illustrating also certain modifications of the hammer; and Fig. 6 is a cross-section on the line 6 6 of Fig. 5.

The mechanism is all contained in an inclosed casing 10 of a generally cylindrical shape, which is preferably made in two parts 11, having meeting flanges, and these parts can be fastened together in any customary manner. On opposite ends the casing is centrally thickened to provide bearings 12 for the central shaft 13, and this can be turned in any convenient way. For most purposes a flexible shaft 14 of the usual kind is desirable, and as the casing is provided with a handle-grip $10^a$ it can be moved around as desired and directed against any part to be operated on, as will presently appear.

The shaft 13 carries a pair of parallel disks 15 and $15^a$, which have meeting bosses 16, placed, preferably, near the periphery and spaced apart to serve as stops to limit the movement in one direction of the hammers 17, which are pivoted between the disks, as shown at 18, and which have faces or heads $17^a$ projecting beyond the circumference of the disks 15. These hammers may be made in many shapes; but I prefer to make them in the form of segments, as in Fig. 1, with the head portion $17^a$ projecting from one radial edge. Any necessary number of these hammers can be employed, and they are arranged to successively strike the head 19 of a plunger 20, which is preferably retracted by a spring 21 and which has a sliding motion limited by the pin 23, which extends through the slot 22 of the plunger. This plunger works in the tool-holder 24, which is made, preferably, integral with the casing 10 and which should be on the side opposite the handle $10^a$, so that the tool held in the holder can be conveniently directed. This holder 24 is adapted to receive the shank 25 of any suitable tool, the shank in the present instance carrying a riveting-head 26, which fits the hammer for riveting purposes, and it will be seen that the rotation of the shaft 13 will cause the hammers 17 to deliver rapid strokes on the plunger 20 and that these strokes will be communicated to the shank 25. Obviously the shank 25 might represent the shank of a rock-drill or other instrument. The space around the shaft 13 between the disks 15 and $15^a$ is preferably filled by rawhide washers $13^a$, which assist in taking up the clatter of the mechanism.

To provide for throwing the hammers in and out of gear, I use, preferably, the mechanism shown in Figs. 2 and 3. Here the disk $15^a$ is provided with holes, (shown by dotted lines at 27 in Fig. 1,) there being one opposite each hammer 17, and these receive the sliding pins 28, which slide through holes in the disk 29 and which are inwardly pressed toward the hammers by springs 30. The disk 29 slides on the shaft 13, and its hub 29ª is groooved, as shown at 31, to receive the forked end 32 of the trigger 33, which is pivoted in the casing 10, as shown at 34 in Fig. 3, and projects outward through a slot 35 in the casing to a point where it can be conveniently grasped by the thumb or finger when the tool is held by the handle 10ª. A spring 33ª presses the trigger 33, so as to normally move in the disk 29 and pins 28, and thus throw the hammer out of gear.

The action is as follows: Supposing the hammers to be in action, the operator releases the trigger 33 and the disk 29 is moved inward, so that the pins 28, pressed by their springs 30, come in contact with the hammers 17 in about the position shown by the dotted lines 27 in Fig. 1. As fast, however, as the hammers move backward out of the paths of the pins 28 the latter spring inward to the position shown in Fig. 4, and so hold the hammers out of action. The reverse action of course releases the hammers, and the mechanism just described thus serves as a simple form of clutch by which the hammers are individually and collectively controlled, so that the shaft 13 can be kept moving and the hammers regulated as desired.

Obviously any suitable means can be employed for rotating the shaft 13. In Figs. 5 and 6 I have shown an electric motor 38, contained in the casing 10, the armature being fast to the shaft 13 and the field carried by the casing, while suitable connections 39 are provided. In this type of the device I prefer to use also a slight modification of the hammer arrangement, in which case a disk 15ᵇ is secured to the shaft 13 and a series of curved hammer-shanks 17ᵇ are pivoted to the disk, as shown at 36, the hammers having heads 17ᶜ projecting beyond the circumference of the disk 15ᵇ, while the pins 37 serve as stops to limit the movement of the hammers. This type of the machine is better adapted for heavier work and the hammers have a little more throw. As the disk rapidly revolves the hammers strike successive blows, as already described, on the plunger 19, and it will be noticed that at the time the hammer-head 17ᶜ strikes the plunger the pivot of the hammer will be a little forward of the radial line between the plunger end and the shaft 13, so that the continued movement of the disk 15ᵇ, together with the rebound of the hammer, causes the latter to be drawn upward and forward, and thus suitable clearance is provided. This same action is true of the construction shown in Fig. 1, except that the action is not so marked.

From the foregoing description it will be seen that I provide a simple, compact, and perfectly-controlled tool which can be safely and conveniently used and which provides for very rapid action. My idea is to provide means for delivering a very rapid series of comparatively light blows rather than to put too much energy into a less number of heavier blows.

It is obvious that some of the details of construction which I have described can be departed from without affecting the principles of the invention and also that instead of the plunger 20 any suitable plunger can be used and that the shank of the tool itself might be made to come into contact with the hammers without affecting the principle of this invention. In the claims, therefore, I shall use the term "plunger" as meaning any suitable object on which the hammers impinge.

Having thus fully described my invention, I claim as new and desire to secure by Letters Patent—

1. A power-hammer, comprising a portable inclosing casing having a tool-holder arranged tangentially therein, a rotatable shaft journaled in the casing, a series of freely-swinging hammers hung around and carried by the shaft so as to swing within the casing opposite the tool-holder, and a clutch mechanism operated from outside the casing and acting to directly engage the individual hammers.

2. A power-hammer, comprising an inclosing casing having a tangentially-arranged tool-holder therein, a rotatable shaft in the casing, a disk carried by the shaft freely-swinging hammers pivoted on the disk and contained wholly within the casing, and a clutch mechanism manually controlled and operating to directly engage the hammers.

3. In a device of the kind described, the combination of the power-shaft, the disk carried thereby, the hammers pivoted on the disk, and the pins slidable through the disks to engage and stop the hammers.

4. In a device of the kind described, the combination with the power-shaft, the freely-swinging hammers supported radially around the shaft and carried thereby, the slide-disk on the shaft and the pins carried by the disk and adapted to engage the hammers as set forth.

5. The combination with the rotary disks and the hammers carried thereby, one of the disks being pierced opposite the hammers, of the spring-pins held in the perforations of the disk and arranged to engage the sides and edges of the hammers.

MILTON T. WESTON.

Witnesses:
JAMES LYNCH,
DELLA VAN HOUTEN.